United States Patent [19]

Brady

[11] Patent Number: 5,010,438

[45] Date of Patent: Apr. 23, 1991

[54] PLUG-IN TRANSIENT VOLTAGE SUPPRESSOR MODULE

[75] Inventor: Peter J. Brady, Glendale, Ariz.

[73] Assignee: Square D Company, Palatine, Ill.

[21] Appl. No.: 367,028

[22] Filed: Jun. 16, 1989

[51] Int. Cl.$^5$ .............................................. H02H 9/06
[52] U.S. Cl. ...................................... 361/56; 361/104; 361/120; 361/127; 361/363; 340/638; 340/662
[58] Field of Search ................... 361/58, 56, 111, 104, 361/356, 363, 361, 120, 124, 127; 340/638, 641, 652, 653, 662

[56] References Cited

U.S. PATENT DOCUMENTS

| | | | |
|---|---|---|---|
| 3,586,903 | 6/1971 | Taterzynski et al. | 315/35 |
| 3,601,632 | 8/1971 | Frazier | 361/56 |
| 4,023,071 | 5/1977 | Fussell | 361/120 |
| 4,168,514 | 9/1979 | Howell | 361/56 |
| 4,361,867 | 11/1982 | Frister et al. | 363/145 |
| 4,502,089 | 2/1985 | Ozawa et al. | 361/127 |
| 4,587,588 | 5/1986 | Goldstein | 361/104 |
| 4,642,733 | 2/1987 | Schacht | 361/363 |
| 4,688,135 | 8/1987 | Leopold | 361/118 |
| 4,740,859 | 4/1988 | Little | 361/56 |

OTHER PUBLICATIONS

Surgitron, Technical Data, Joslyn Model 1250-33, 9/86.
Surgitron, Technical Data, AC Arresters, Joslyn.

Primary Examiner—Todd E. Debber
Attorney, Agent, or Firm—Cahill, Sutton & Thomas

[57] ABSTRACT

A plug-in surge suppressor module for insertion into a circuit breaker panel includes four stacks of metal oxide varistors (MOVs) arranged in a cloverleaf pattern on opposite sides of an elongated copper ground bus attached to one lead of each of the metal oxide varistors. The other leads of two of the stacks of metal oxide varistors are attached to a terminal of a U-shaped first resistive wire fuse, another terminal of which is connected to a first AC power line conductor. The other leads of the other two stacks of MOV's are attached to a terminal of a second U-shaped resistive wire fuse, another terminal of which is connected to a second AC power line conductor. A monitor circuit senses the presence of power and continuity of both fuses by pulsing a light emitting indicator diode every cycle of the AC line. A low frequency oscillator circuit produces slow blinking of the light emitting indicator diode which alerts an observer to replace te surge suppressor module if one of the fuses fails.

20 Claims, 3 Drawing Sheets

PLUG-IN TRANSIENT VOLTAGE SUPPRESSOR MODULE

BACKGROUND OF THE INVENTION

The invention relates to transient voltage suppressors, and more particularly, to a transient voltage suppressor module that is contained in a housing similar in size and shape to a circuit breaker housing, and can be plugged into a circuit breaker or load distribution panel.

Protecting sensitive electronic equipment in homes and businesses from short duration voltage and current pulses caused by lightning or switching large currents into and out of commercial power lines, etc. presents a difficult challenge. To meet the challenge, a variety of commercially available pulse suppressor components, such as metal oxide varistors (MOV's), air gap or spark gap suppressors, and high power semiconductor pulse suppressors (such as the assignee's TRANSZORB devices) are widely used.

The concept of incorporating a surge protection device in a circuit-breaker-like housing is disclosed in U.S. Pat. No. 4,642,733. However, that reference does not provide any disclosure of a surge suppressor which, as a practical matter, can be enclosed within a housing of the same general size and shape as a conventional plug-in circuit breaker and is capable of meeting the so-called "10KA Category C requirements". (The "10KA Category C requirements" are established by ANSI/IEEE C62.41-1980, and require that the suppressor withstand both a 10 kiloampere current pulse having a rise time of approximately 8 microseconds and a fifty percent decay time of 20 microseconds. The 10KA Category C requirement also specifies that the suppressor be able to withstand a 6 kilovolt pulse having a rise time of 1.2 microseconds and a fifty percent decay time of 50 microseconds.) The cost and physical size limitations of currently available 10KA Category C surge suppressor devices and the need for them to reliably withstand a reasonably large number (i.e., approximately 50 or more) of 10 kiloampere transient current pulses presents a major design problem if it is necessary that the entire suppressor assembly be included in a small housing having dimensions of approximately three inches by three and one-half inches by three-fourths of an inch. This is the maximum practical size if the suppressor module is to be plugged into a single slot of a residential circuit breaker or load distribution panel.

A typical low cost 20 millimeter MOV is rated to survive only one 6.5 kiloampere current pulse, and typically would not survive even one 10 kiloampere current pulse. MOV's gradually degrade when subjected to current pulses within their rating, until they eventually fail by short circuiting. If an MOV short-circuits, it often explodes if an ordinary 110 volt AC line voltage then is applied across it. Consequently, "fail safe" fusing is necessary. No commercially available fuses are both capable of surviving a 10 kiloampere Category C pulse, and are small enough to fit into a housing that is roughly the size of a conventional plug-in circuit breaker.

The potential market for a surge suppressor module pluggable into a circuit breaker panel requires that it provide a readily observable indication of whether the module needs to be replaced.

Accordingly, there is an unmet need for a low cost, reliable transient voltage suppressor (TVS) module which meets the 10KA Category C requirements and can be plugged into a standard circuit breaker panel or the like.

SUMMARY OF THE INVENTION

Accordingly, it is an object of the invention to provide a low cost, practical, reliable surge suppressor module within a circuit-breaker-sized housing that can be plugged into a circuit breaker or load distribution panel or the like.

It is another object of the invention to avoid exploding of a short-circuited metal oxide varistor when a 110 volt or greater AC power line voltage is applied across it.

It is another object of the invention to avoid flashing and charring of a short-circuited metal oxide varistor when AC line voltage is applied across it.

It is another object of the invention to provide a plug-in surge suppressor in a circuit-breaker-sized plug-in housing that can withstand a large number of 10 kiloampere surges.

It is another object of the invention to provide a low cost plug-in transient voltage suppressor module which can meet the so-called 10KA Category C requirement.

It is another object of the invention to provide a low cost plug-in transient voltage suppressor module which can meet the so-called 10KA Category C requirement, and provide a status indicator which indicates if AC power is present and also whether the suppressor module needs to be replaced.

Briefly described, and in accordance with one embodiment thereof, the invention provides a plug in surge suppressor module including a printed circuit board, a ground bus (preferably an elongated copper strip) soldered to a metal conductor on the printed circuit board, first and second fuses each including a resistive wire fuse connected in parallel with an air gap suppressor, connected between first and second power line conductors and first and second groups of parallel-connected metal oxide varistors, respectively. Each of the metal oxide varistors has a second terminal that is connected by the metal conductor to the ground bus. The junction between the first group of parallel-connected metal oxide varistors and the first fuse is connected to a first input of a status monitor circuit. The junction between the second group of parallel-connected metal oxide varistors and the second fuse is connected to a second input of the status monitor circuit. The status monitor circuit produces a drive signal if both of the first and second fuses are intact, causing high speed blinking of a light emitting indicator diode at the power line frequency, which appears as constant illumination to an observer's eye. Simultaneously, a rectifier delivers DC power from one of the power line conductors to an oscillator circuit that generates pulses at a slow rate and applies them to the light emitting diode. If either of the fuses fails, blinking of the diode at the line frequency stops, and continued blinking of the light emitting diode occurs only at the slow rate produced by the oscillator, indicating the surge suppressor module should be changed. A pair of conductive elements on the printed circuit board connect the first and second power line conductors to first and second conductive prongs that make electrical contact with corresponding power line conductors in the circuit breaker panel when the module is plugged therein. A plastic housing of the surge suppressor is generally rectangular and has the same general size and shape as a conventional circuit breaker module.

DETAILED DESCRIPTION OF THE PREFERRED EMBODIMENT

Figures 1, 2A:
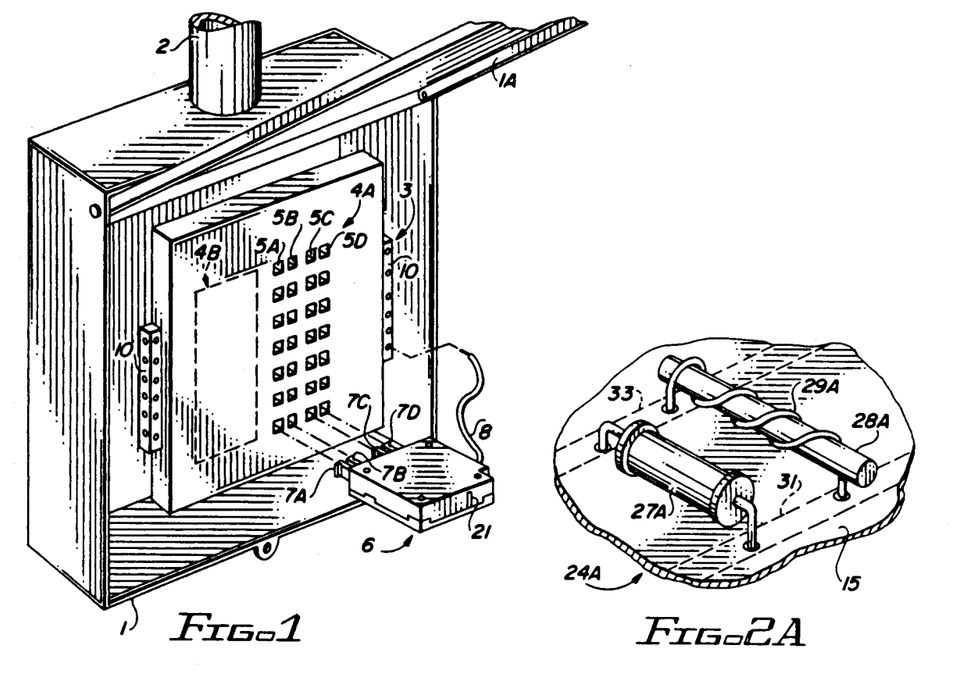
FIG. 1 is a perspective view of the surge suppressor module of the present invention and a circuit breaker panel into which the surge suppressor module can be plugged.
FIG. 2A is a partial perspective view illustrating a fuse used in the surge suppressor shown in FIG. 2.

Referring to FIG. 1, a circuit breaker or load distribution box 1 includes a rectangular housing with a front door 1A. Electrical power lines, including at least two conductors 31 and 32 (FIG. 3) and a neutral or ground conductor 8 pass through a conduit 2 into circuit breaker box 1 and are connected to a back panel 3 attached to the inner back surface of circuit breaker box 1. Back panel 3 includes a pair of copper bus bars held on the support panel under a plastic front panel. The front panel has apertures such as 5A, 5B, 5C, and 5D positioned in area 4A in FIG. 1 hereof to allow terminal guard bosses 7A, 7B, 7C, and 7D of the surge suppressor module 6 and circuit breaker modules to be inserted and make electrical contact with the copper bus bars. Back panel 3 also includes another set of apertures such as 5A-5D positioned in area 4B.

The surge suppressor 6 is contained in a housing from which the above-mentioned terminal guards 7A, 7B, 7C, and 7D extend. A ground wire conductor 8 (FIG. 1) can be connected by a screw threaded into hole 23 in an end 20C of an internal copper ground bus 20 (shown in FIG. 2). Ground conductor 8 can be soldered or welded directly to end section 20C. Ground wire 8 has an exposed end which is inserted into a receptacle in one of ground terminal bars 10 (FIG. 1) in back panel 3.

Figure 2:
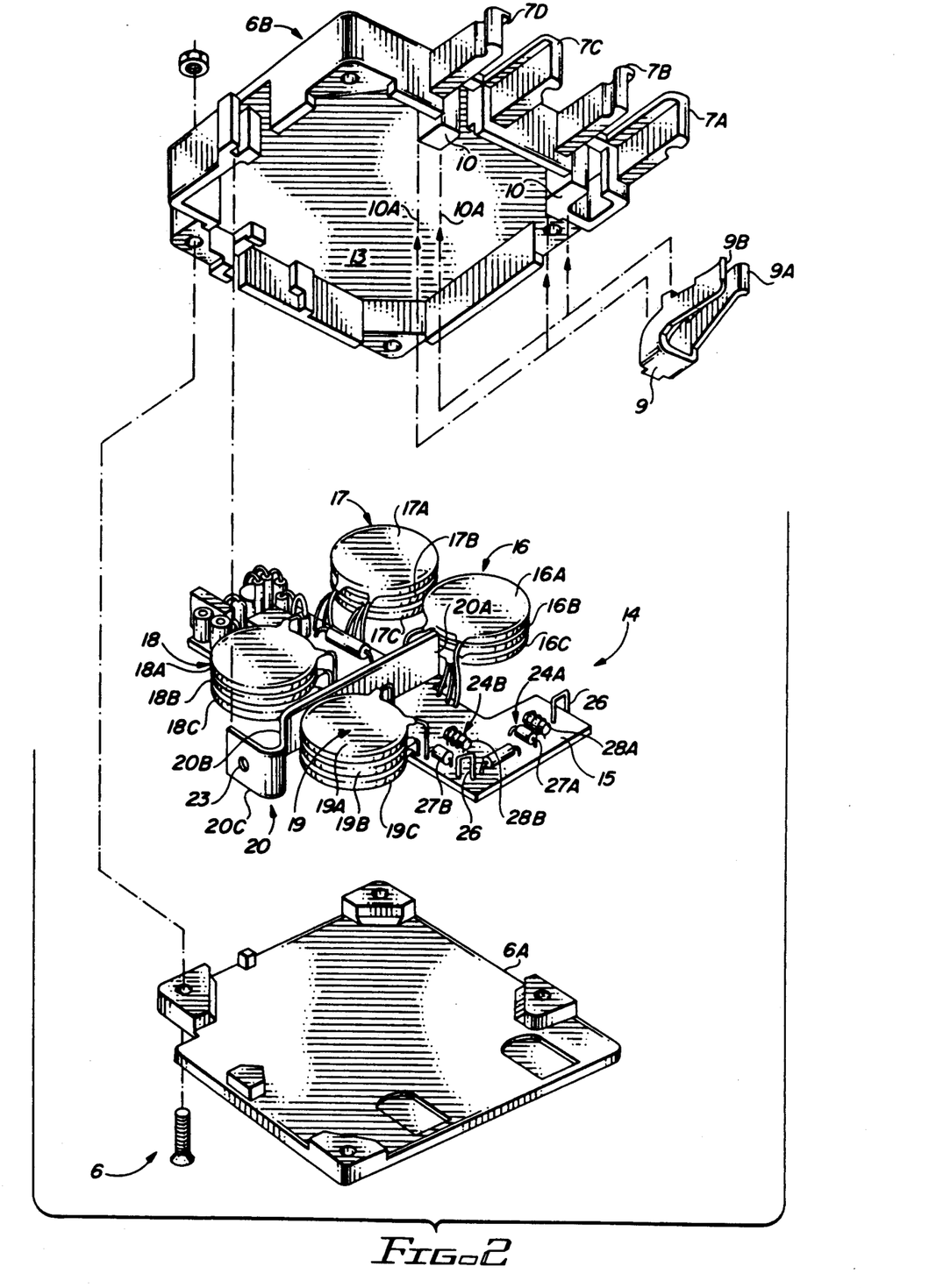
FIG. 2 is an exploded perspective view of the surge suppressor module of FIG. 1.
Figure 4:
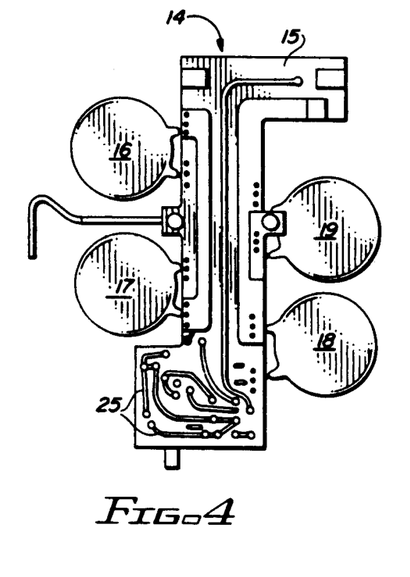
FIG. 4 is a top plan view of the surge suppressor assembly of FIG. 2.
Figure 5:
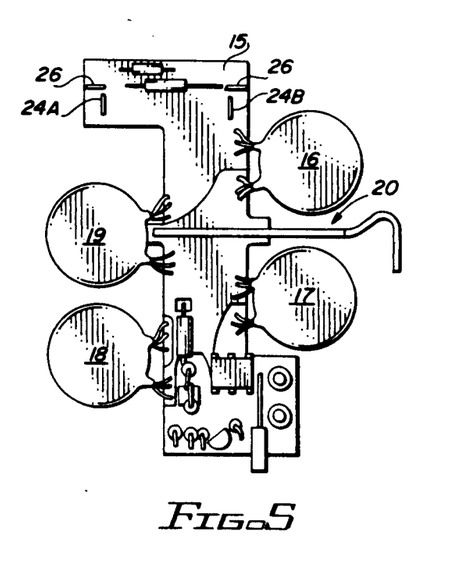
FIG. 5 is a bottom plan view of the surge suppressor assembly of FIG. 2.

The internal and external structure of surge suppressor 6, including surge suppressor assembly 14 and housing sections 6A and 6B are shown in detail in FIGS. 2, 4, and 5. However, it would be most helpful to first describe the circuitry 14A contained in the surge suppressor assembly 14 before proceeding with a description of the physical structure.

Figure 3:
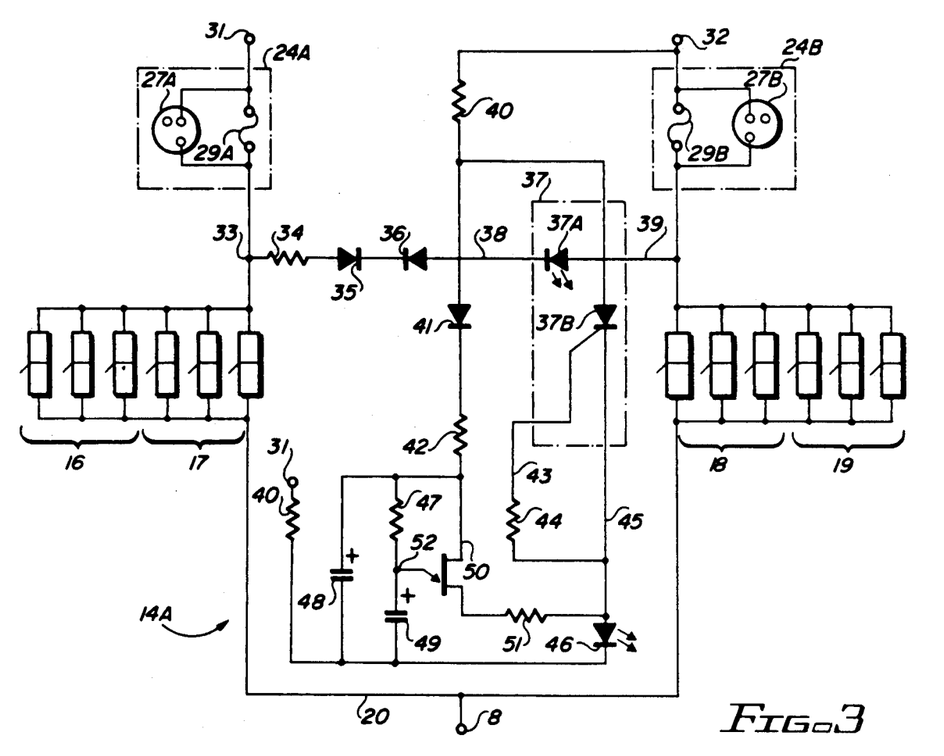
FIG. 3 is a schematic diagram of an electronic surge suppressor circuit contained within the housing of the surge suppressor module.

Referring to FIG. 3, surge suppressor assembly circuit 14A includes four groups each including three 20 millimeter metal oxide varistors (MOV's), the four groups being designated by numerals 16, 17, 18, and 19. (Such MOV's are readily available as part #SNR271KD20 from Sanken.) The six MOV's in each of groups 16 and 17 are connected in parallel between ground conductor 8 and conductor 33. Conductor 33 is connected to one terminal of fuse 24A, the other terminal of which is connected to power line conductor 31. Fuse 24A includes a resistive wire fuse 29A and a spark gap suppressor 27A. Conductor 33 also is connected by a 12 kilohm, one-half watt resistor 34 to the anode of a 200 volt zener-diode 35, which can be a 1N5280.

The cathode of zener-diode 35 is connected to the cathode of diode 36 (which can be a 1N4004), the anode of which is connected by conductor 38 to the cathode of a light-emitting diode 37A contained in an optically coupled SCR (silicon controlled rectifier) module 37, which can be a model 4N40 manufactured by Motorola. The anode of light-emitting diode 37A is connected by conductor 39 to one terminal of fuse 24B and to a first terminal of each of the MOV's in groups 18 and 19. Fuse 24B includes a resistive wire fuse 29B and a spark gap arrestor 27B. The second terminals of MOV's 18 and 19 are connected to ground conductor 8. The other terminal of fuse 24B is connected to power line conductor 32. Power line conductor 32 also is connected by an 18 kilohm, half watt resistor 40 to the anode of SCR 37B and to the anode of diode 41 (which can be a 1N4004). The optically coupled SCR unit 37 can be a 4N40, available from various vendors.

The cathode of diode 41 is connected by a 5.6 kilohm, quarter watt resistor 42 to the B1 electrode of a unijunction transistor (UJT) 50 (which can be an MU10 manufactured by Motorola, Inc.), to one terminal of a 15 kilohm, quarter watt resistor 47, and to one terminal of a 3.3 microfarad capacitor 48. The other terminal of resistor 47 is connected by conductor 52 to the emitter electrode of UJT 50 and to one terminal of a 3.3 microfarad capacitor 49. The opposite terminals of capacitors 48 and 49 are connected by resistor 40A to power line conductor 31. The B2 electrode of UJT 50 is connected to one terminal of a 270 ohm resistor 51, the other terminal of which is connected to the anode of a light-emitting diode (LED) 46. The cathode of LED 46 is connected by resistor 40A to power line conductor 31. The anode of light-emitting diode 46 is connected by conductor 45 to the cathode of SCR 37B and to one terminal of 15 kilohm resistor 44. The other terminal of resistor 44 is connected by conductor 43 to the gate electrode of SCR 37B.

Each of the MOV's in groups 16, 17, 18, and 19 is matched with the others connected in parallel therewith so that they all have highly similar high current conduction characteristics. It is not necessary that the non-parallel-connected MOV's have equal high current conduction thresholds, however. It has been found that the entire range of various manufacturers' 20 millimeter MOV parts may be used, as long as they are grouped by matching high current (e.g. 100-1500 amps) conduction characteristics. This is important because it results in low cost by avoiding the need to "cull out" some of the available MOV's.

I have found that using two groups or "stacks" of three MOV's each, namely groups 16 and 17 or groups 18 and 19, so that parallel-connected MOV's having similar high current conduction characteristics allows each group of six parallel-connected MOV's to have a useful life of more than about fifty 10 kiloampere Category C surges.

The fuses 24A and 24B are not commercially available, and had to be created, as subsequently described, using precisely formed helical coil resistive wire fuses in parallel with an air gap suppressor, or using resistive wire staples in order to achieve "fail safe" fusing that could survive more than about fifty 10 kiloampere pulses, yet would reliably fail if nominal AC power line voltages are applied between conductors 31 and 32 as any of the MOV's begins to fail.

The surge suppressor circuit 14 of FIG. 3 includes multiple mode status monitoring circuitry that provides a visual indicator diode 46 (which is mounted on the upper right hand corner of the surge suppressor housing when it is plugged into the back panel 3, as indicated by numeral 21 in FIG. 1) to indicate if AC power is present, and if surge suppressor module 6 needs to be replaced because of fuse failure.

As indicated above, failure of the surge suppressor module 6 occurs when any of the MOV's has absorbed enough energy (from many overvoltage situations) to degrade its condition to the point that ordinary AC line voltage peaks/surges between conductors 31 and 32 progresses toward short-circuiting of that MOV. Such a progression then results in blowing of the fuse 24A or 24B connected in series with that MOV.

As long as both fuses 24A and 24B remain intact, the voltage across the optically coupled SCR circuit 37 reaches the threshold of the circuit including zener diode 35, diode 36 (which has a 400 volts reverse breakdown voltage), and LED 37A every other half cycle, firing SCR 37B and causing a pulse of current to flow through light-emitting indicator diode 46. This occurs at a 60 hertz rate, so the human eye interprets as constant the illumination produced by diode 46 when AC power is present and both fuses 24A and 24B are intact.

If either of fuses 24A or 24B blows, possibly due to the short-circuiting of one of the MOV's, LED 37A is not turned on, and does not fire SCR 37B. Power line conductor 32 supplies DC current through resistor 40 and rectifier diode 41 to a conventional relaxation oscillator including unijunction transistor 50, resistor 47, and capacitors 48 and 49. The values of resistor 47 and capacitor 48 are selected so that UJT 50 fires low frequency (e.g., 2 hertz) current pulses to indicator LED 46, causing it to blink slowly, thereby alerting maintenance personnel that the surge suppressor module needs to be replaced.

FIGS. 2, 4, and 5 show how the circuit of FIG. 3 is constructed so as to fit into the housing which includes lower section 6A and upper section 6B (FIG. 2). Upper section 6B includes a cavity 13 into which the surge suppressor assembly 14 fits. Four rivets attach the bottom section 6A to the underside of upper section 6B to form the closed housing of module 6.

Housing sections 6A and 6B are formed of electrically insulative plastic, such as CYGLASS 605. A first pair of insulative terminal guards 7A and 7B integral with upper section 6B extend on either side of a pair of conductive prongs 9A and 9B, respectively, of a- metal terminal clamp 9 that makes electrical contact with one of the above-mentioned copper bus bars in back panel 3. A similar conductive clamp (not shown) is encompassed by terminal guards 7C and 7D.

Surge suppressor assembly 14 includes an L-shaped printed circuit (PC) board 15 on which all of the MOV's, fuses, and other components of the circuit 14A of FIG. 3 are mounted. FIG. 4 shows a bottom view of suppressor assembly 14, and FIG. 5 shows a top view thereof. In FIG. 4, numeral 25 designates several of the metal strip conductors formed on the bottom surface of PC board 15 constituting the interconnections in the schematic diagram of FIG. 3.

In FIG. 2, it can be seen that the four groups of MOV's 16, 17, 18, and 19 are arranged in a "cloverleaf" configuration consisting of four "stacks" each of which includes three matched MOV's connected in parallel. More specifically, stack or group 16 includes three MOV's 16A-C all connected in parallel, their leads extending through via holes in printed circuit board 15 and soldered to appropriate metal strips 25 on the bottom surface, using conventional soldering techniques. Similarly, stack 17 includes MOV's 17A-C connected in parallel and mounted adjacent to stack 16. Stack 18 includes MOV's 18A-C, and stack 19 includes MOV's 19A-C arranged in the generally rectangular or cloverleaf pattern shown.

Fuses 24A and 24B each include a helically wound section of resistive wire, formed around a cylindrical coil form, and a spark gap suppressor. For example, fuse 24A is shown better in FIG. 2A, includes resistive wire 29A helically wound approximately half a dozen times around wire form 28A, and also includes spark gap suppressor 27A. The ends of helically wound resistive wire 29A extend through via holes in printed circuit board 15 or are soldered to axial leads of carbon composition resistors which in turn extend through via holes in printed circuit board 15 and are soldered to conductors 31 and 33, respectively. Spark gap suppressor 27A can be a model CG23350L, manufactured by General Instrument C. P. Clare Division. Its leads extend into via holes of printed circuit board 15 and are soldered to conductors 31 and 33, respectively. Fuse 24B is essentially identical to fuse 24A, except its leads are connected to conductors 32 and 39.

The resistive wire sections 29A and 29B of fuses 24A and 24B are formed of 32 gauge resistive wire composed of 22 percent nickel and 78 percent copper. The length of each resistive wire section is approximately one inch between its soldered connections.

Figure 7:
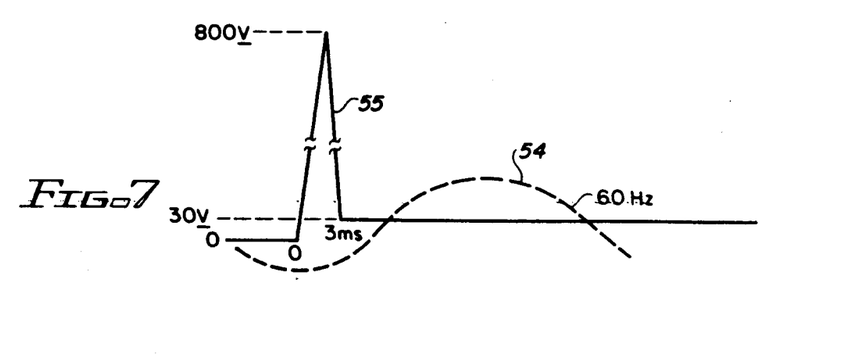
FIG. 7 is a graph useful in explaining the combined operation of the fuses and metal oxide varistors in the circuit of FIG. 3.

It is necessary that the helical wire sections 29A and 29B be "fragile" enough to melt as a result of elevated currents caused by impending MOV failure. It was found to be necessary to include air gap suppressors 27A and 27B in parallel with the helical resistive wire sections 29A and 29B in order to protect the wire sections when they are made fragile enough to achieve the necessary melting when the current therein due to the 60 hertz 110 volt power line voltage 54 shown in FIG. 7 on power line conductors 31 and 32 begins to increase due to impending failure of one of the MOV's from a short duration (3 microseconds) 800 or greater volt transient pulse 55 in FIG. 7. The air gap suppressors 27A and 27B were found to be needed to rapidly respond to and dissipate the transient voltage pulse 55, by rapidly clamping it to approximately 30 volts, thus limiting the voltage drop across, the current through, and the power dissipation in the fragile wire section. The air gap suppressor is unaffected by the 60 hertz AC power line signal 54.

A pair of conductive spring wiper elements 26 are connected to conductors 33 and 39 and press against the sides of conductive terminal clamps 9 when the surge suppressor assembly 14 is pressed into cavity 13 of upper housing section 6B and the terminal clamps 9 are positioned on the bosses 10, as indicated by dashed lines 10A. Alternately, elements 26 can be soldered/welded to terminal clamps 9.

Copper ground bus 20, which is connected to the bottom electrode of MOV's 16-19 as shown in FIG. 3, is attached to the upper surface of printed circuit board 15, and includes an elongated section 20A, an inclined section 20B, and a perpendicular end section 20C having screw hole 23 therein. Ground conductor 8 can be soldered/welded or connected by a screw (not shown) to end section 20C of ground bus 20. Ground bus 20 is soldered to a metal layer on the upper surface of printed circuit board 15 so as to provide low resistance, low inductance connections to the MOV's. The substantial cross-sectional area of the copper conductor and its connection to the internal circuit board (whose conductor cross-sections have been increased with plating and/or soldered on conductors) and the external connection to the ground lead 8 result in low impedance to the transient current, permitting minimal voltage drop across that section of the electrical conduction path. The overall result is greatly improved surge protector clamping levels, which are typically only a third of those presently marketed 10KA Category C surge protectors.

The dimensions of housing 6A,B are approximately 3 inches by 3.5 inches by three-fourths of an inch. Terminal guards 7A–D extend 0.7 inches beyond the upper section 6B. The wall thicknesses of the housing are typically 0.1 inches. The above-described surge suppressor assembly 14 thus succeeds in accomplishing the needed suppressor function in the available space in cavity 13.

Figure 6:
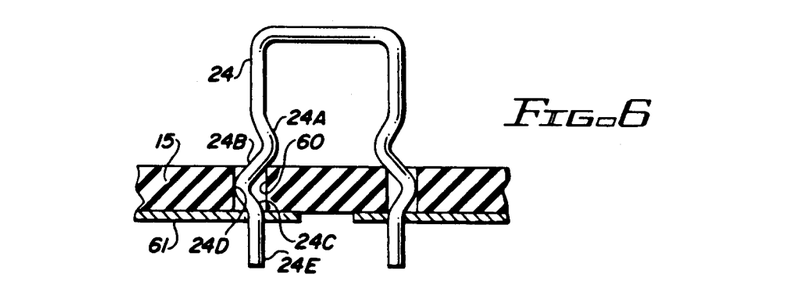
FIG. 6 is a section view of a U-shaped resistive wire fuse in the surge suppressor assembly of FIG. 2.

Alternately, fuses 24A and 24B can be implemented as kinked, resistive wire staple-like structures, designated by numeral 24 in FIG. 6. In FIG. 6, numeral 61 designates one of the metal traces 25 on the bottom surface of PC board 15. Numeral 60 designates a predrilled via hole therein. The resistive wire of which fuse 24 is comprised is 78 percent copper and 22 percent nickel.

Each of the two legs of fuse 24 is kinked in the manner shown, including an upper inclined section 24A, oppositely inclined section 24B, a section 24C parallel to section 24A, and a vertical bottom section 24E. The angle of inclination, the diameter of the wire, and the diameter of the drilled hole 60 are such that the upper edge of the hole 60 abuts the lower surface of section 24B of the resistive wire, thereby precisely determining the length of wire above conductive trace 61, to which the lower section 24E is soldered. Precise, repeatable fuse resistance is thereby achieved. Fuses 24 are easily inserted into appropriate holes in the printed circuit board 15 and soldered using conventional printed circuit board assembly techniques. Thermal conduction of heat out of the installed resistive wire fuse is such that the fuse blows within a few seconds after an MOV becomes short-circuited.

While the invention has been described with reference to a particular embodiment thereof, those skilled in the art will be able to make the various modifications to the described structure without departing from the true spirit and scope of the invention. For example, if the ground wire 8 is replaced by a copper bus bar extending from end 20C of ground bus 2 to the ground terminal bar 10, the inductance and resistance of ground conductor 8 can be substantially reduced.

What is claimed is:

1. A surge suppressor module capable of repeatedly suppressing ten kiloampere surges, comprising in combination:
   (a) a printed circuit board having a plurality of metal strip conductors thereon, and a plurality of via holes extending through the printed circuit board and through the various metal strip conductors;
   (b) an elongated ground bus generally perpendicular to the printed circuit board having an edge soldered to a metal conductor on the printed circuit board;
   (c) a first fuse having a first terminal connected to a first power line conductor, and a second terminal, and a second fuse having a first terminal connected to a second power line conductor and also having a second terminal;
   (d) a first group of metal oxide varistors each having a first terminal and a second terminal, the first terminal of each of the metal oxide varistors of the first group being connected to the second terminal of the first fuse, the second terminals of the metal oxide varistors of the first group being connected, respectively, by some of the metal strip conductors to the edge of the ground bus by means of the metal conductor, and a second group of metal oxide varistors each having a first terminal and a second terminal, the first terminals of the metal oxide varistors of the second group being connected to the second terminal of the second fuse, the second terminals of the metal oxide varistors of the second group being connected by some of the metal strip conductors to the edge of the ground bus by means of the metal conductor, the metal oxide varistors of the first and second groups being positioned on opposite sides of the ground bus;
   (e) a plastic housing adapted to be plugged into a single slot of a power distribution panel enclosing the printed circuit board, the ground bus extending through a first edge wall of the housing;
   (f) means for connecting an external ground conductor to the ground bus;
   (g) first and second conductive prongs extending through a second edge wall of the housing;
   (h) first and second means attached to the printed circuit board and electrically connected to the first and second power line conductors for electrically contacting the first and second conductive prongs, respectively.

2. The surge suppressor module of claim 1 wherein the metal oxide varistor suppressors are disk-shaped, the first group including a first stack of the metal oxide varistors and a second stack of the metal oxide varistors adjacent to the first stack, the second group including third and fourth stacks of the metal oxide varistors, the third stack being adjacent to the fourth stack.

3. The surge suppressor module of claim 2 wherein the metal oxide varistors are 20 millimeter metal oxide varistors, and wherein each of the first, second, third, and fourth stacks includes three of the metal oxide varistors.

4. The surge suppressor module of claim 3 wherein the first and second stacks are on a first side of the ground bus and the third and fourth stacks are on a second side of the ground bus.

5. The surge suppressor module of claim 1 wherein each of the metal oxide varistors of the first group has a high current conduction characteristic that matches the high current conduction characteristics of the other metal oxide varistors, respectively, of the first group, and wherein each of the metal oxide varistors of the second group has a high current, current conduction characteristic that matches the high current conduction characteristics of the other metal oxide varistors, respectively, of the second group.

6. The surge suppressor module of claim 1 wherein the ground bus is copper and includes an elongated section having a generally rectangular cross-section, and is bent to form an end section perpendicular to a major axis of the elongated section, the external ground conductor connecting means including a weld connecting the external ground conductor to the end section.

7. The surge suppressor module of claim 1 wherein the first and second fuses are each capable of conducting a 10 kiloampere current and each includes a helical section of resistive wire connected in parallel with a spark gap suppressor.

8. The surge suppressor module of claim 7 wherein the helical section of resistive wire are 32 gauge resistive wire having a wire length of approximately one inch and are composed of 78% copper and 22% nickel.

9. The surge suppressor module of claim 1 including status circuit means for indicating whether either of the first and second resistive wire fuses is blown.

10. The surge suppressor module of claim 9 wherein the status circuit means includes:
(a) first circuit means coupled between the second terminals of the first and second resistive wire fuses for producing an indicator drive signal every cycle of an AC power line signal applied between the first and second power line conductors if neither of the first and second resistive wire fuses is blown;
(b) a light emitting indicator diode coupled to receive the indicator drive signal, whereby the light emitting diode appears to a human eye to be steadily lit as long as both of the first and second resistive wire fuses remain intact.

11. The surge suppressor module of claim 10 wherein the status circuit means includes an oscillator circuit, a rectifier coupled between one of the first and second power line conductors and the oscillator circuit to supply DC power to the oscillator circuit, and means in the oscillator circuit for supplying pulses of current at a slow rate that is substantially slower than a frequency of the AC power line signal to the light emitting indicator diode to cause it to blink at a relatively slow rate to indicate a blown fuse condition.

12. The surge suppressor module of claim 11 wherein the first circuit means includes an optically coupled silicon controlled rectifier device having control inputs coupled between the second terminals of the first and second resistive wire fuses, the light emitting indicator diode having an anode coupled to one of the first and second power line conductors and a cathode coupled to the other of the first and second power line conductors.

13. The surge suppressor of claim 12 wherein the oscillator oscillates at a frequency of approximately 2 hertz, and includes a unijunction transistor relaxation oscillator coupled between the rectifier and the first power line conductor, an emitter of a unijunction transistor being coupled to the anode of the light emitting indicator diode.

14. The surge suppressor module of claim 4 wherein the plastic housing is generally rectangular, having dimensions of approximately three inches by three and one-half inches by three-fourths of an inch.

15. A method of suppressing a ten kiloampere surge, comprising the steps of:
(a) plugging a surge suppressor module having first and second conductive prongs into a load distribution panel to electrically connect the first and second conductive prongs to first and second power line conductors, respectively, the surge suppressor module including an insulative housing and a cavity containing a surge suppressor assembly including a printed circuit board and a first group of parallel-connected metal oxide varistors mounted on the printed circuit board and connected in series with a first fuse mounted on the printed circuit board, and a second group of parallel-connected metal oxide varistors mounted on the printed circuit board and connected in series with a second fuse;
(b) conducting a power surge through the first fuse, the first group of the metal oxide varistors, and a ground bus connected to an external ground conductor;
(c) monitoring the electrical continuity of the first and second fuses by
   i. producing a first indicator signal at least every cycle of an AC power line voltage applied between the first and second power line conductors in response to a voltage difference between a first terminal of the first fuse and a first terminal of the second fuse, a second terminal of the first fuse being connected to the first power line conductor, a second terminal of the second fuse being connected to the second power line conductor, and
   ii. applying the first indicator signal to a silicon controlled rectifier coupled between the first power line conductor and an anode of a light emitting indicator diode,
whereby a relatively high frequency of pulsing of the light emitting indicator diode appears as constant illumination as long as both the first and second fuses have electrical continuity, and whereby the light emitting indicator diode does not appear constantly illuminated if one of the first and second resistive wire fuses has blown.

16. The method of claim 15 including producing an indication of a blown condition of one of the first and second fuses by supplying power to an oscillator circuit from one of the first and second power line conductors, and causing the oscillator to produce a second indicator signal at a relatively low frequency that is much lower than the frequency of the first indicator signal, and applying the second indicator signal to the light emitting indicator diode so that if one of the first and second fuses fails, the light emitting indicator diode blinks only at a relatively slow rate.

17. A surge suppressor module capable of repeatedly suppressing ten kiloampere surges, comprising in combination:
(a) a printed circuit board having a plurality of metal strip conductors thereon, and a plurality of via holes extending through the printed circuit board and through the various metal strip conductors;
(b) an elongated ground bus generally perpendicular to the printed circuit board on the printed circuit board;
(c) a first fuse having a first terminal connected to a first power line conductor, and a second terminal, and a second fuse having a first terminal connected to a second power line conductor and also having a second terminal;
(d) a first metal oxide varistor having a first terminal and a second terminal, the first terminal of the first metal oxide varistor being connected to the second terminal of the first fuse, the second terminal of the first metal oxide varistor being connected by a first one of the metal strip conductors to the ground bus, and a second metal oxide varistor having a first terminal and a second terminal, the first terminal of the second metal oxide varistor being connected to the second terminal of the second fuse, the second terminal of the second metal oxide varistor being connected by a second one of the metal strip conductors to the ground bus, the first and second metal oxide varistors being positioned on opposite sides of the ground bus;

(e) a plastic housing adapted to be plugged into a single slot of a power distribution panel enclosing the printed circuit board, the ground bus extending through the housing;

(f) first and second conductive prongs extending through the housing;

(g) first and second means attached to the printed circuit board for electrically connecting the first and second power line conductors to the first and second conductive prongs, respectively.

18. A method of suppressing a current surge, comprising the steps of:

(a) plugging a surge suppressor module having first and second conductive prongs into a load distribution panel to electrically connect the first and second conductive prongs to first and second power line conductors, respectively, the surge suppressor module including an insulative housing containing a surge suppressor assembly including first and second metal oxide varistors mounted and connected in series with first and second fuses, respectively;

(b) conducting a power surge through the first fuse, the first metal oxide varistor, and a ground bus connected to an external ground conductor;

(c) monitoring the electrical continuity of the first and second fuses by i. producing a first indicator signal every cycle of an AC power line voltage applied between the first and second power line conductors in response to a voltage difference between a first terminal of the first fuse and a first terminal of the second fuse, a second terminal of the first fuse being connected to the first power line conductor, a second terminal of the second fuse being connected to the second power line conductor, ii. applying the first indicator signal to a silicon controlled rectifier coupled between the first power line conductor and an anode of a light emitting indicator diode, iii. supplying power from the first power line conductor to an oscillator circuit and causing the oscillator to oscillate as a slow blinking frequency, iv. causing the light emitting indicator diode to blink at the slow blinking rate, whereby a relatively high frequency of pulsing of the light emitting indicator diode appears as constant illumination as long as both the first and second resistive wire fuses have electrical continuity, and whereby the light emitting indicator diode does not appear constantly illuminated and instead blinks at a relatively slow rate if AC line power is present and one of the first and second resistive wire fuses has blown.

19. A surge suppressor comprising:

(a) first and second surge suppressors each having a first terminal connected to a ground conductor, each also having a second terminal;

(b) a fuse having one terminal connected to a first power line co and another terminal connected to the second terminal of first surge suppressor, and a second fuse having one terminal to a second power line conductor and another terminal connected to the second terminal of the second surge suppressor;

(c) an indicator circuit having a pair of sensing terminals connected to the second terminals of the first and second surge suppressors, respectively for producing an indicator pulse signal every cycle of a power line signal applied between the first and second power line conductors;

(d) a light emitting indicator diode having a cathode connected to the ground conductor and an anode connected to receive the indicator signal;

(e) an oscillator circuit connected to receive DC power through the rectifier connected to the first power line conductor, the oscillator circuit being coupled between the rectifier and the ground conductor, for producing a current pulse to the light emitting indicator diode at a much slower frequency than the frequency of the power line signal, whereby the light emitting indicator diode appears to be constantly illuminated when the power line signal is present and the first and second fuses are intact, the blinking of the light emitting diode ceases but the slow blinking of the light emitting in a dictator diode continues if either the first or second fuse blows.

20. A surge suppressor module capable of repeatedly suppressing ten kiloampere surges, comprising in combination:

(a) a printed circuit board having a plurality of metal strip conductors thereon, and a plurality of via holes extending through the printed circuit board and through the various metal strip conductors;

(b) an elongated ground bus generally perpendicular to the printed circuit board having an edge soldered to a metal conductor on the printed circuit board;

(c) a first fuse having a first terminal connected to a first power line conductor, and a second terminal, and a second fuse having a first terminal connected to a second power line conductor and also having a second terminal;

(d) a first group of metal oxide varistors each having a first terminal and a second terminal, the first terminal of each of the metal oxide varistors of the first group being connected to the second terminal of the first fuse, the second terminals of the metal oxide varistors of the first group being connected, respectively, by some of the metal strip conductors to the edge of the ground bus by means of the metal conductor, and a second group of metal oxide varistors each having a first terminal and a second terminal, the first terminals of the metal oxide varistors of the second group being connected to the second terminal of the second fuse, the second terminals of the metal oxide varistors of the second group being connected by some of the metal strip conductors to the edge of the ground bus by means of the metal conductor, the metal oxide varistors of the first and second groups being positioned on opposite sides of the ground bus;

(e) a plastic housing adapted to be plugged into a single slot of a power distribution panel enclosing the printed circuit board, the ground bus extending through a first edge wall of the housing;

(f) means for connecting an external ground conductor to the ground bus;

(g) first and second conductive prongs extending through a second edge wall of the housing;

(h) first and second means attached to the printed circuit board and electrically connected to the first and second power line conductors for electrically contacting the first and second conductive prongs, respectively;

wherein the first and second fuses are each capable of conducting a ten kiloampere current and each includes a helical section of resistive wire connected in parallel with a spark gap suppressor, the helical sections of resistive wire having sufficient resistance to melt when the current therein due to normal line voltage between the ground bus and the first or second power line conductors increases due to impending failure of any of the metal oxide varistors of the first and second groups as a result of transient current surges.

* * * * *